(12) United States Patent
Wu et al.

(10) Patent No.: US 9,026,835 B2
(45) Date of Patent: May 5, 2015

(54) COMPUTER SYSTEM FOR CONFIGURING A CLOCK

(71) Applicant: Huawei Technologies Co., Ltd., Shenzhen, Guangdong (CN)

(72) Inventors: Dengben Wu, Shenzhen (CN); Yu Zhang, Shenzhen (CN); Baifeng Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 13/717,205

(22) Filed: Dec. 17, 2012

(65) Prior Publication Data

US 2013/0103971 A1    Apr. 25, 2013

Related U.S. Application Data

(63) Continuation of application No. PCT/CN2011/077625, filed on Jul. 26, 2011.

(51) Int. Cl.
*G06F 1/04* (2006.01)
*G06F 1/12* (2006.01)
*G06F 11/16* (2006.01)
*G06F 11/20* (2006.01)

(52) U.S. Cl.
CPC .. *G06F 1/04* (2013.01); *G06F 1/12* (2013.01); *G06F 11/1604* (2013.01); *G06F 11/20* (2013.01)

(58) Field of Classification Search
CPC ............ G06F 1/04; G06F 1/10; H04L 7/0083
USPC .......................................... 713/600; 327/292
See application file for complete search history.

(56) References Cited

U.S. PATENT DOCUMENTS 4,239,982 A * 12/1980 Smith et al. .................... 327/142
5,357,491 A * 10/1994 Yamasaki ...................... 368/156

(Continued)

FOREIGN PATENT DOCUMENTS

CN     1394004 A    1/2003
CN     1493040 A    4/2004

(Continued)

OTHER PUBLICATIONS

1st Office Action in corresponding Chinese Patent Application No. 201180001193.7 (Mar. 11, 2013).

(Continued)

*Primary Examiner* — Vincent Tran
(74) *Attorney, Agent, or Firm* — Leydig, Voit & Mayer, Ltd.

(57) ABSTRACT

The present invention relates to a computer system and a clock configuring method. The computer system comprises at least two nodes, wherein each of the at least two nodes includes a selecting module and a CPU, inputs to the selecting module of any node comprise a clock of the node and a clock output from other node, and an output terminal of the selecting module is connected to the CPU and an input terminal of the selecting module of other node; the computer system further comprises a clock controlling module, whose output terminal is connected to a control terminal of the selecting module to control the clocks of the at least two nodes to be the same clock. When clocks of plural nodes are abnormal, the computer system can still normally operate as long as there is a normal clock in the computer system.

6 Claims, 6 Drawing Sheets

(56) References Cited

U.S. PATENT DOCUMENTS

| | | | |
|---|---|---|---|
| 5,398,317 A | 3/1995 | Nugent | |
| 5,404,363 A * | 4/1995 | Krause et al. | 714/814 |
| 5,758,132 A | 5/1998 | Strahlin | |
| 6,310,895 B1 * | 10/2001 | Lundh et al. | 370/503 |
| 6,754,171 B1 * | 6/2004 | Bernier et al. | 370/216 |
| 2002/0121555 A1 | 9/2002 | Cipolla et al. | |
| 2005/0200394 A1 * | 9/2005 | Underwood et al. | 327/292 |
| 2006/0250160 A1 * | 11/2006 | Chang et al. | 326/93 |
| 2007/0025483 A1 | 2/2007 | Emami-Neyestanak et al. | |
| 2007/0294561 A1 * | 12/2007 | Baker et al. | 714/4 |
| 2008/0046770 A1 * | 2/2008 | Jong et al. | 713/375 |
| 2009/0055676 A1 * | 2/2009 | Wiebe | 713/501 |
| 2010/0318831 A1 | 12/2010 | Scott et al. | |
| 2012/0105112 A1 * | 5/2012 | Davis | 327/142 |
| 2012/0117415 A1 * | 5/2012 | Arumugham et al. | 713/503 |

FOREIGN PATENT DOCUMENTS

| | | |
|---|---|---|
| CN | 1905435 A | 1/2007 |
| CN | 101090341 A | 12/2007 |
| CN | 101192913 A | 6/2008 |
| CN | 102317885 A | 1/2012 |
| EP | 0412328 A2 | 2/1991 |
| JP | 11103312 A | 4/1999 |

OTHER PUBLICATIONS

International Search Report in corresponding PCT Patent Application No. PCT/CN2011/077625 (Apr. 12, 2012).

* cited by examiner

COMPUTER SYSTEM FOR CONFIGURING A CLOCK

CROSS-REFERENCE TO RELATED APPLICATIONS

This application is a continuation of International Patent Application No. PCT/CN2011/077625, filed on Jul. 26, 2011, which is hereby incorporated by reference in its entirety.

FIELD OF THE TECHNOLOGY

The present invention relates to computer system technology, and more particularly, to a computer system and a clock configuring method for achieving node clock synchronization of an identical partition system in a computer system.

BACKGROUND

Usually, such a computer system as a minicomputer requiring high computational and fault-tolerant performances consists of a plurality of different nodes, wherein the nodes are the smallest units of hard partition, each node can independently form a partition or can interconnect with other nodes to form a partition, and on each partition can run an independent operating system. Specifically, several independent nodes in the computer system form an integral whole, namely a partition system, via the CPU interconnection technology. Under this integral whole can run an operating system that may access to any valid device on the nodes pertaining to the partition.

Each node in a partition system not only requires clocks, but also requires clocks of the same source. This is so because clocks are of great importance in digital circuits—once there is no clock, it would be entirely impossible for digital logic to properly operate. Moreover, if various nodes in a partition system did not use clocks of the same source, it would also be impossible for the entire partition to normally operate.

In prior-art technology, the partition system makes use of a single clock synchronization scheme to achieve clock synchronization in the partition system. That is to say, there is only one clock in a partition system to serve as the clock source for various nodes within the partition system, and the clock is either placed on a certain node of the partition system, or separated from the various nodes so as to be separately arranged.

The prior-art technology is defective in the fact that since there is only one clock serving as a clock source in a partition system, when this clock malfunctions, there would be no clock source available in that partition system, and it would be impossible to achieve clock synchronization of the various nodes within the partition system.

SUMMARY

Embodiments of the present invention aim to provide a computer system and a clock configuring method for achieving node clock synchronization of an identical partition system in the computer system, so as to make it still possible to achieve synchronization of clocks of various nodes of the same partition system in the computer system during clock source failure within the partition system.

Provided in the embodiments of present invention is a computer system, which comprises at least two nodes, wherein each of the at least two nodes includes a selecting module and a CPU, inputs to the selecting module comprise clock of the local node and clock output from other node, and an output terminal thereof is connected to the CPU and an input terminal of the selecting module of other node.

The computer system further comprises a clock controlling module, whose output terminal is connected to a control terminal of the selecting module for controlling the clocks of the at least two nodes to be the same clock.

In the computer system provided by the embodiments of the present invention, the input terminal of the selecting module of each node not only has a clock source of the current node but also has clock outputs of other node; the selecting module is controlled by a third party such as the aforementioned clock controlling module to select a clock input as the clock input of the node, and it is possible to provide clocks for other nodes, so as to guarantee that the various nodes use the same clock source; when clocks of plural nodes are abnormal, the computer system can still normally operate as long as there is a normal clock in the computer system.

Further provided in the embodiments of present invention is a clock configuring method for achieving node clock synchronization of an identical partition system in a computer system, which method comprises:

a selecting step, for selecting clock of a node as a clock source of a partition system to which the node pertains;

an initiating step, for initiating a connection channel between the node serving as the starting point and a node directly connected thereto serving as a finishing point as a clock channel between the node and the node directly connected thereto; and a determining step, for determining whether the node serving as the finishing point is connected to the remaining nodes in the partition system, if yes, executing the initiating step, if not, completing clock configuration of the partition system.

In the clock configuring method for achieving node clock synchronization of an identical partition system in the computer system provided by the embodiments of the present invention, by making use of the structural characteristic that there are plural clocks selectable by each node in an identical partition system of the computer system, it is guaranteed that the various nodes within the same partition system have the same clock source by selecting a connection channel for two connected nodes in the same partition system, thereby achieving synchronization of clocks of the various nodes within the same partition system; moreover, other connection channels are selectable when the clock channel is abnormal, whereby it is still guaranteed that the various nodes within the same partition system have the same clock source, and that synchronization of clocks of the various nodes within the same partition system is achieved.

DETAILED DESCRIPTION

To make clearer the objectives, technical solutions and advantages of the present invention, the present invention is described in greater detail below with reference to the accompanying drawings.

Figure 1:
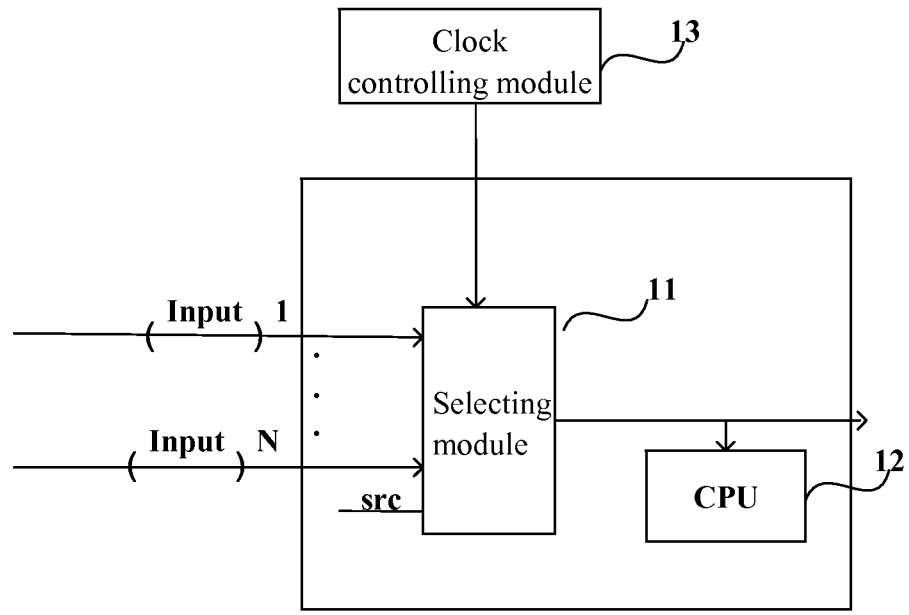
FIG. 1 is a view schematically illustrating the structure of a node in the computer system provided by the embodiments of the present invention.

The computer system provided by the embodiments of the present invention includes at least two nodes, wherein, as shown in FIG. 1, the at least two nodes each include a selecting module 11 and a CPU 12, inputs Input 1, . . . Input N to the selecting module 11 are clock src of the current node and clock output from the other node, and an output terminal (output) thereof is connected to the CPU 12 and an input terminal of the selecting module of the other node.

The computer system further includes a clock controlling module 13, whose output terminal is connected to the control terminal of the selecting module to control the clocks output from the output terminals of the at least two nodes to be the same clock.

In the above technical solution, the input terminal of the selecting module of each node not only has the clock source of the current node but also has clock output of the other node; the selecting module is controlled by a third party such as the aforementioned clock controlling module to select a clock input as the clock input of the node, and it is possible to provide clock for the other node, so as to guarantee that all the nodes use the same clock source; when clocks of plural nodes are abnormal, the computer system can still normally operate as long as there is a normal clock in the computer system.

Figure 2:
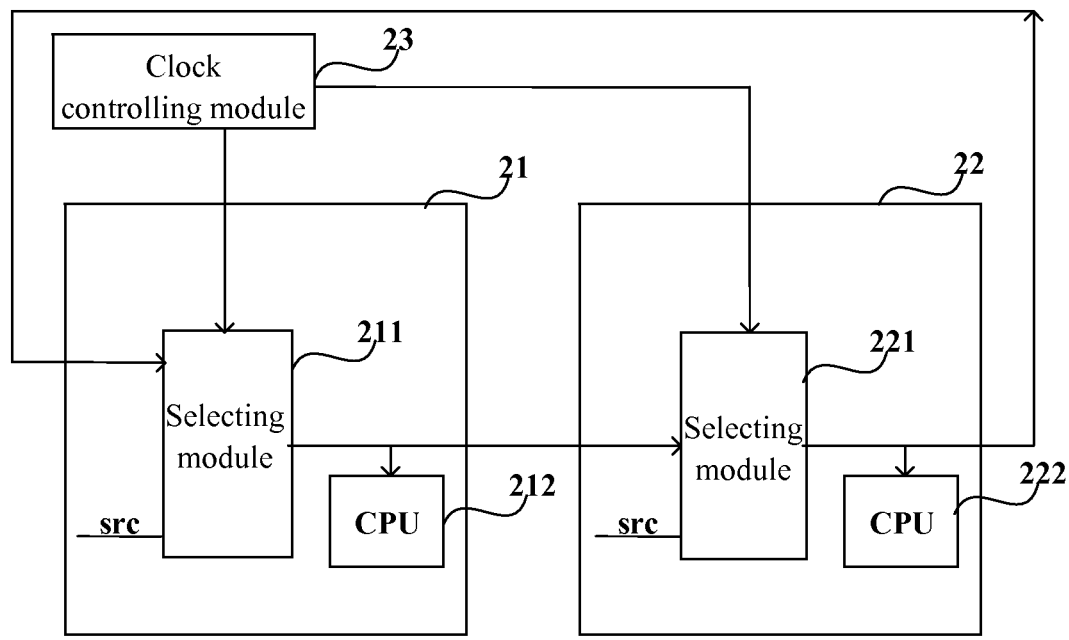
FIG. 2 is a view schematically illustrating clock connection of two nodes in the computer system provided by the embodiments of the present invention.

When there are two nodes in the computer system, the two nodes are directly connected to each other. As shown in FIG. 2, the output terminal of selecting module 211 in node 21 is directly connected to the input terminal of selecting module 221 in node 22, and the output terminal of selecting module 221 in node 22 is connected to the input terminal of selecting module 211 in node 21. Moreover, in node 21 and node 22, the other inputs to the selecting modules are clocks src of their own nodes. The output terminal of selecting module 211 in node 21 is connected to CPU 212 of the current node, and the output terminal of selecting module 221 in node 22 is connected to CPU 222 of the current node. Nodes 21 and 22 are connected in a bidirectional way, one of the connections may be closed in use, and the closed connection is initiated when the connection in use becomes abnormal.

The control terminals of selecting module 211 and selecting module 221 are both controlled by clock controlling module 23 for output. In other words, inputs to the selecting module of each node are the clock of the current node and the clock of the other node. Under control of the clock controlling module 23, the clock src of one node is taken as a common clock source, thereby guaranteeing synchronization of clocks of every node.

Figure 3A:
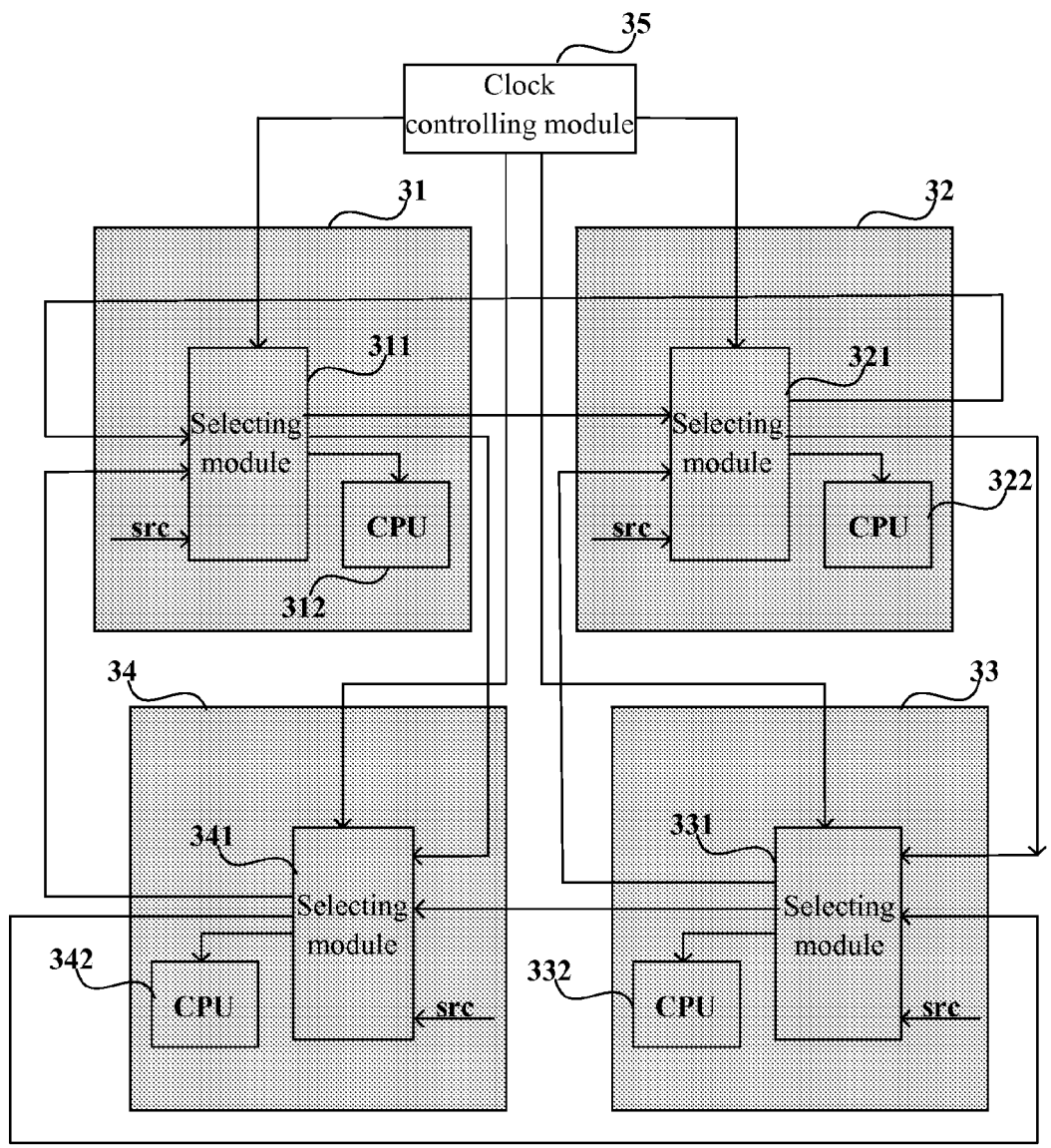
FIG. 3A is a view schematically illustrating clock connection of four nodes in the computer system provided by the embodiments of the present invention.
Figure 3B:
FIG. 3B is a view schematically illustrating the framework of FIG. 3A.

In a case where there are four nodes in the computer system, the connection mode among them is similar to that shown in FIG. 2, that is, the four nodes are connected to one another via respective selecting modules into a loop, and inputs to the selecting module of each node are clock of the current node and outputs from the selecting modules of the two nodes connected thereto. As shown in FIGS. 3A and 3B, the computer system has four nodes, namely node 31, node 32, node 33 and node 34, and the selecting modules of the four nodes are sequentially connected into a loop, as shown in FIG. 3B. Specifically, in node 31, the output terminal of selecting module 311 is connected to the input terminals of selecting module 321 in node 32 and selecting module 341 in node 34, and connected to CPU 312 of the current node; in node 32, the output terminal of selecting module 321 is connected to the input terminals of selecting module 311 in node 31 and selecting module 331 in node 33, and connected to CPU 332 of the current node; in node 33, the output terminal of selecting module 331 is connected to the input terminals of selecting module 321 in node 32 and selecting module 341 in node 34, and connected to CPU 322 of the current node; and in node 34, the output terminal of selecting module 341 is connected to the input terminals of selecting module 311 in node 31 and selecting module 331 in node 33, and connected to CPU 342 of the current node. Moreover, the control terminals of all the selecting modules are connected to the clock controlling module 35, under control of which all nodes select a clock source src of the one identical node as a common clock source. Likewise, in FIG. 3A, the connection between any two nodes is bidirectional connection—that is to say, there are two connection channels, namely clock channels, between two connected nodes; the uninitiated connection channel should be closed. When the clock channel in use becomes abnormal, a clock channel is reselected according to the normal status of the clock channels.

Figure 4A:
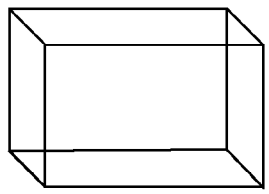
FIG. 4A is a view schematically illustrating a clock connection framework of eight nodes in the computer system provided by the embodiments of the present invention.

In a case where there are eight nodes in the computer system, the eight nodes are located at various vertices of a cuboid, four nodes within various surfaces of the cuboid are cross connected to one another via selecting modules or any two adjacent nodes are connected to one another via selecting modules, and eventually each node is connected to other three nodes via selecting modules. As shown in FIG. 4A, the four nodes at various surfaces of the cuboid are sequentially connected via selecting modules into a loop, and connection of the loop is similar to that shown in FIG. 3A. Each node is connected to three nodes via selecting modules, and the connection between any two nodes is bidirectional connection—that is to say, there are two connection channels, namely clock channels, between two connected nodes. One connection channel thereof may be closed, and the other connection channel is used. The closed connection channel is initiated when the connection channel in use becomes abnormal. The connection mode of the cuboid as obtained differs from that shown in FIG. 3A in the fact that each node is connected to three nodes, specifically, inputs to the selecting module of each node are the clock of the current node and the outputs from the selecting modules of the three nodes connected thereto.

In a case where there are n×8 nodes in the computer system, every eight nodes are located at various vertices of a cuboid, four nodes within each surface of the cuboid are cross connected to one another via selecting modules or connected sequentially one after the other via selecting modules, and each node is connected to 3+n nodes via selecting modules. Connection of the cuboid is similar to that shown in FIG. 4A. Nodes at the same positions on the cuboids are connected via selecting modules, and inputs to the selecting module of each node are clock of the current node and outputs from the selecting modules of the 3+n nodes connected thereto, wherein n is a natural number. Likewise, the connection between any two nodes is bidirectional connection—that is to say, there are two connection channels, namely clock channels, between two connected nodes. One connection channel thereof may be closed during use, and the other connection channel is used. The closed connection channel is initiated when the connection in use becomes abnormal.

Figure 4B:
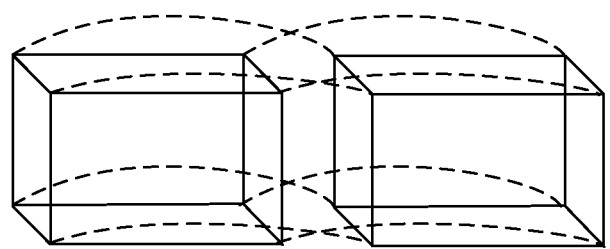
FIG. 4B is a view schematically illustrating a clock connection framework of sixteen nodes in the computer system provided by the embodiments of the present invention.
Figure 5:
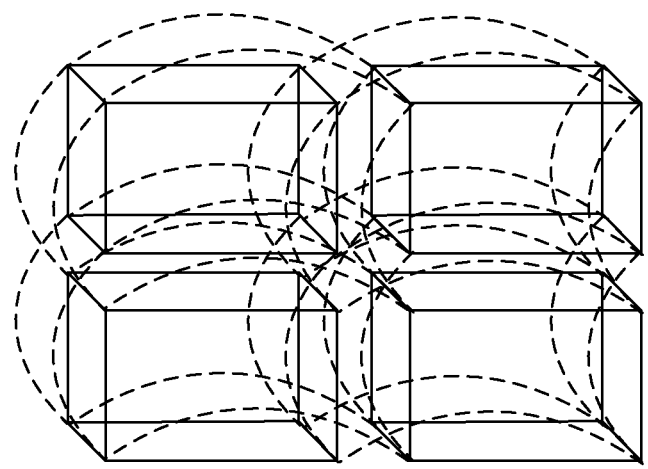
FIG. 5 is a view schematically illustrating a clock connection framework of thirty-two nodes in the computer system provided by the embodiments of the present invention.

For instance, when there are sixteen nodes in the computer system, a structure as shown in FIG. 4B is obtained after connection, and when there are thirty-two nodes in the computer system, a structure as shown in FIG. 5 is obtained after connection. Node connections for computer systems with sixty-four nodes and one hundred and twenty-eight nodes are similar to those described above. Eight nodes are located at various vertices of a cuboid, and each node is connected to three adjacent nodes. When the system has multiple(s) of eight nodes, every eight nodes connected by the mode mentioned above as a whole can also be regarded as one point, and then each point is connected to the other by the connection mode mentioned above. For instance, sixteen nodes are located at various vertices of two cuboids, and points at the same positions on the two cuboids are then connected. And so on, connections of thirty-two nodes and sixty-four nodes could be realized, which will not be enumerated in this context.

While partitioning the computer system provided by the aforementioned embodiments, in order to guarantee a top fault-tolerant performance of the partition system, nodes with the most connections should be selected to form a partition as far as possible, for instance, two directly connected nodes are constructed as a partition system, or four nodes connected into a loop are constructed as a partition system. For a computer system with n×8 nodes, it is also possible to construct 8 nodes connected into a cuboid as a partition system. This is because clock synchronization merely puts demand on the same partition system, while formation of the nodes with the most connections into a partition system can guarantee, to the maximum degree, that a substitute channel could be found in the case certain nodes in the partition system become abnormal, without affecting other partition systems.

Moreover, when clocks at nodes are abnormal, it should be guaranteed that at least one node clock in the partition is normal while constructing a partition system, otherwise the partition system would have to use clocks of other partition systems. After partitions are constructed in the computer system, nodes pertaining to the same partition system in the computer system are directly or indirectly connected to one another, and the intermediate nodes of an indirect connection and the two end nodes of the indirect connection are located in the same partition system. In a computer system with n×8 nodes, for example, eight nodes connected into a cuboid are constructed as a partition system.

After partitioning of the computer system provided by the aforementioned embodiments, if the clock source is abnormal in a certain partition system, operation of the partition system will not be affected as long as there is a normal clock in that partition system. If a certain clock channel of the partition system becomes abnormal, nodes downstream of the abnormal clock channel can properly operate, the partition system can still normally operate as long as there is another normal channel. If a certain node of the partition system functions abnormally, after the abnormal node is removed, the partition system can still normally operate as long as the clocks of the remaining nodes can be interconnected by routing. Thus, if there are so many abnormal nodes in a partition system that the clock channels of the remaining nodes cannot be interconnected by routing, it is impossible to construct a partition with the remaining nodes, but it is possible to newly construct several independent partitions according to the status of the partition.

Detailed explanation is made below with a minicomputer having eight nodes as an example.

Figure 6:
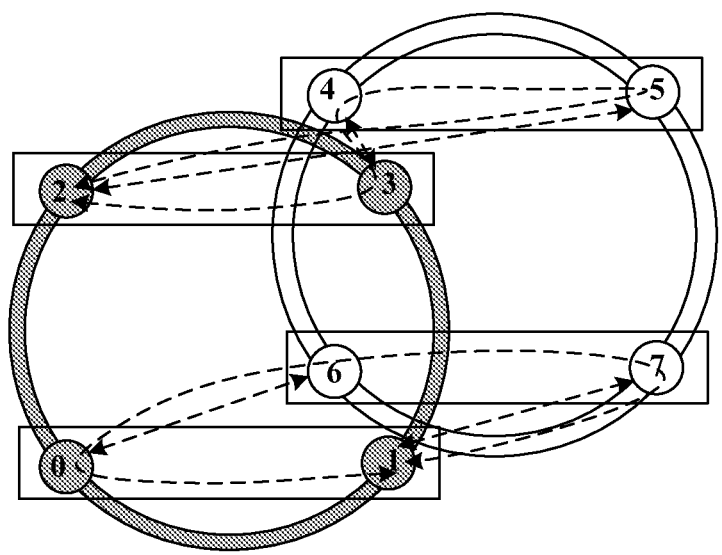
FIG. 6 is a view schematically illustrating a computer system with eight nodes provided by the embodiments of the present invention.

As shown in FIG. 6, node 0, node 1, . . . , and node 7 are connected via selecting modules, and expressed as a cuboid; in other words, node 0 to node 7 are located at various vertices of the cuboid, four nodes are sequentially connected to form a loop at front, back and lower surfaces of the cuboid, and four nodes at the upper surface of the cuboid are cross connected to one another as backup clock synchronization route—for instance, sequential connection at the front and back surfaces, and cross connection at the upper surface—, this is so because when there are plural nodes going wrong, the probability is relatively high for the directly connected nodes to appear simultaneously, so that the cross connection is adopted in the connections of clocks, while the number of connections of each node remains generally invariant. FIG. 6 visually explains how to find the corresponding clock channel when a certain node clock becomes abnormal, so as to ensure normality of the clock chain.

A clock relation routing table shown in the following Table 1 is generated according to the connection relations illustrated in FIG. 6.

TABLE 1

| Clock Relation Connection Table | |
|---|---|
| Starting Point | Finishing Point |
| 0 | 1, 2, 6 |
| 1 | 0, 3, 7 |
| 2 | 0, 3, 5 |
| 3 | 1, 2, 4 |
| 4 | 3, 5, 6 |
| 5 | 2, 4, 7 |
| 6 | 0, 4, 7 |
| 7 | 1, 5, 6 |

When any limited number of clocks and clock channels become abnormal, it is always possible to attempt to find other substitute clock channels from the clock relation routing table, and to use the found substitute clock channels to substitute the abnormal clock channels. Moreover, when selecting a clock, it is needed not only to select whether to use the clock of the node, but also to select the initiated clock channel, thereby ensuring one clock source for all nodes.

Since it is not possible to have a clock connection between any two nodes, some clock channels need routes of other nodes to form channels; in order to reduce error rate and to enhance setting speed, when partitioning is performed, partitions are constructed in accordance with the aforementioned partitioning mode.

Suppose a 2P partition system is to be constructed, two directly connected nodes are selected to form a partition system. Generally, various node clocks in a partition system are all provided by the nodes within the partition, so as to prevent partition systems from interfering with each other. If all node clocks of a certain partition system become abnormal, it is possible to provide all nodes of the partition system with clocks by a node of a connected partition system, but whether clocks of the partition system normally operate or not is then controlled by the other partition. Under such a circumstance, it is possible to separate the two nodes from each other to perform partitioning again, and to form two independent 2P partitions with other connected nodes respectively.

Suppose a 4P partition system is to be constructed. Normally, the fault-tolerant probability is highest when four nodes connected up and down or front and back with one another into a loop are randomly selected to form a partition system. However, if plural node clocks are already abnormal during construction of the partition, the partition should be reasonably constructed according to the aforementioned partitioning principle to ensure that all partition systems can normally operate.

Suppose a 6P partition system is to be constructed, four nodes are first selected according to the mode in which 4P partition is constructed, and then any two adjacent nodes capable of forming 2P, namely two directly connected nodes, are randomly selected to construct a 6P partition system together with the constructed 4P partition system.

Suppose an 8P partition system is to be constructed, all nodes in the computer system can form an 8P partition system.

Clock configuration of a partition system is explained below with an example of an 8P partition system.

Figure 7:
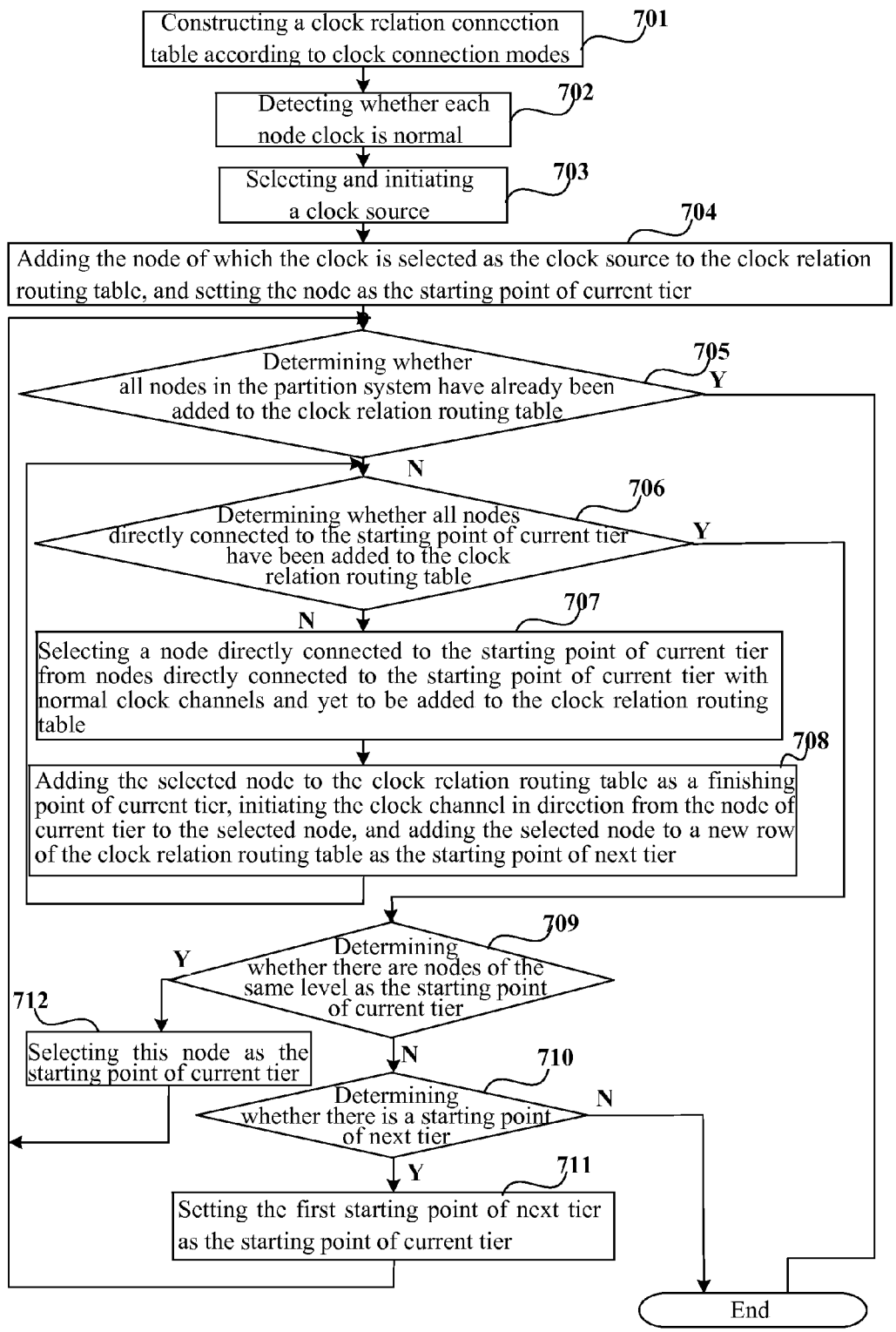
FIG. 7 is a flowchart illustrating the clock configuring method for achieving node clock synchronization of an identical partition system in the computer system provided by the embodiments of the present invention.

As shown in FIG. 7, the configuring flow includes the following steps.

Step 701—constructing a clock relation connection table according to clock connection modes, as shown in Table 1, each row of Table 1 represents one tier, and each tier has a starting point and a finishing point. The connections between the starting point and the finishing point are bidirectional connection channels, specifically, there is not only a connection channel from the starting point to the finishing point, but also a connection channel from the finishing point to the starting point—for instance, in Table 1, node 0 is the starting point and node 1 is the finishing point in the second row, whereas node 1 is the starting point and node 0 is the finishing point in the third row. The subsequent steps are performed on repetitive direct or indirect connections for nodes such that the connections are simplified as unidirectional and non-repetitive connections, and directed to selecting from the bidirectional connection channels between directly connected nodes one connection channel as a clock channel between the directly connected nodes and another connection channel as backup, such that clock configuration could be performed again for the partition system in case of clock abnormality, channel abnormality or node abnormality.

Step 702—detecting normality of each node clock.

Step 703—selecting and initiating a clock source. Specifically, a normal node clock is selected as the clock source, among main node clock, node clock of the current partition, and node clock of other partitions in an order of main node clock→node clock of the current partition→node clock of other partitions, and this node clock is initiated.

Typically, clock of the main node is selected as the clock source, that is to say, if there is no abnormality occurred to it, the clock of the main node is selected; if there is abnormality, the clock of a node directly connected to the main node in the same partition is selected as the clock source. Suppose an 8P partition is constructed in FIG. 6, node 0 is the main node, and abnormality of the clock at node 0 is detected. In such a case, a normal clock of a node which is connected to node 0, for example, any one of node 1, node 2 and node 6 connected to node 0, is selected as the clock source.

Step 704—adding the node of which the clock is selected as clock source to the clock relation routing table, and setting the node as a starting point of the current tier. The clock relation routing table is similar to Table 1 as they both include starting point and finishing point as table entries, and the difference between them is that in the clock relation routing table, the columns of both the starting point and the finishing point are empty at the very beginning, and corresponding entries are gradually added with the execution of subsequent steps. Taking the computer system shown in FIG. 6 as an example, if the clock of node 0 is the clock source, node 0 is added to the clock relation routing table as the starting point of the first tier.

Step 705—determining whether all nodes in the partition system have already been added to the clock relation routing table. If all nodes have been added to the clock relation routing table, the clock configuration is completed, otherwise Step 706 is executed.

Step 706—determining whether all nodes directly connected to the starting point of the current tier in the partition system have already been added to the clock relation routing table. If they are present in the clock relation routing table, Step 709 is executed, otherwise Step 707 is executed.

Step 707—selecting a node directly connected to the starting point of the current tier among nodes directly connected to the starting point of the current tier with normal clock channels and yet to be added to the clock relation routing table.

Step 708—adding the node selected in Step 707 to the clock relation routing table as one entry of the finishing point of the current tier, initiating the clock channel in the direction from the node of the current tier to the node selected in Step 707, and adding the selected node to the next row of the clock relation routing table as one entry of the starting point of the next tier. Thereafter, Step 706 is executed again.

Step 709—determining whether there are nodes of the same level as the starting point of the current tier, for example, the starting point of the current is N hops away from the clock source, and certain nodes are also N hops away from the clock source. When such kind of node exists and has not been added to the clock relation routing table, and the clock channel between this node serving as the finishing point of the previous tier and the starting point of the previous tier is normal, Step 712 is executed, otherwise Step 710 is executed.

Step 710—determining whether there is a starting point of the next tier. If the determination is positive, Step 711 is executed, otherwise the clock configuration ends.

Step 711—setting the first found starting point of the next tier as the starting point of the current tier, and continuing to execute Step 705.

Step 712—selecting this node as the starting point of the current tier, and continuing to execute Step 705.

Take the computer system shown in FIG. 6 as an example, and suppose that in the computer system node 0 is the main node, and the clock of node 0 is normal.

Then, the clock of node 0 is selected as the clock source, and node 0 is added to the clock relation routing table, as shown in Table 2.

TABLE 2

Clock Relation Routing Table

| Starting Point | Finishing Point |
|---|---|
| Node 0 | |

Figure 8A:
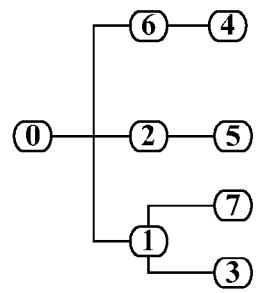
FIG. 8A is a view illustrating a clock channel after configuration of the clock in FIG. 7.
Figure 8B:
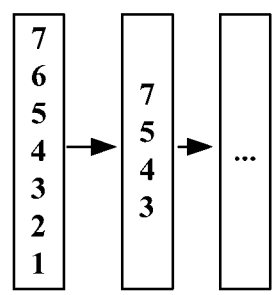
FIG. 8B is a view schematically illustrating the remaining nodes not configured in the configuring process in FIG. 7.

The remaining nodes which have not been configured in the system are shown in the first upright box in FIG. 8B.

It is then determined whether the respective connection channels between node 0 and nodes 1, 2 and 6, which are directly connected to node 0, are normal; if the respective connection channels between node 0 and nodes 1, 2 and 6 are normal, the connection channel in a direction from node 0 to node 1 is initiated or selected as the clock channel between node 0 and node 1, the connection channel in a direction from node 0 to node 2 is initiated or selected as the clock channel between node 0 and node 2, and the connection channel in a direction from node 0 to node 6 is initiated or selected as the clock channel between node 0 and node 6, and node 1, node 2 and node 6 are added to the clock relation routing table as finishing points of the first tier.

TABLE 3

| Starting Point | Finishing Point |
|---|---|
| Node 0 | Node 1, Node 2, Node 6 |

Remaining nodes which have not been configured in the system are shown in the second upright box in FIG. 8B.

Moreover, node 1, node 2 and node 6 are taken as the starting points of the next tier to determine whether the connection channels between node 1 and nodes 3 and 7 are normal, where node 3 and node 7 are nodes that are directly connected to node 1. If the connection channels between node 1 and nodes 3 and 7 are normal, the connection channel in a direction from node 1 to nodes 3 is initiated or selected as the clock channel between node 1 and node 3, and the connection channel in a direction from node 1 to nodes 7 is initiated or selected as the clock channel between node 1 and node 7, and node 1, node 3 and node 7 are added to the clock relation routing table as one tier, with node 1 being the starting point of the tier and node 3 and node 7 being the finishing points of the tier, as shown in Table 4.

TABLE 4

| Starting Point | Finishing Point |
|---|---|
| Node 0 | Node 1, Node 2, Node 6 |
| Node 1 | Node 3, Node 7 |

It is determined whether the connection channels between the node 2 and node 5, which is directly connected to node 2, are normal; if the connection channels between node 2 and node 5 are normal, the connection channel in a direction from node 2 to node 5 is taken as the clock channel between node 2 and node 5, and node 2 and node 5 are added to the clock relation routing table as one tier, with node 2 being the starting point of the tier and node 5 being the finishing point of the tier, as shown in Table 5.

TABLE 5

| Starting Point | Finishing Point |
|---|---|
| Node 0 | Node 1, Node 2, Node 6 |
| Node 1 | Node 3, Node 7 |
| Node 2 | Node 5 |

It is determined whether the connection channels between node 6 and node 4, which is directly connected to node 6, are normal; if the connection channels between node 6 and node 4 are normal, the connection channel in a direction from node 6 to node 4 is taken as the clock channel between node 6 and node 4, and node 6 and node 4 are added to the clock relation routing table as one tier, with node 6 being the starting point of the tier and node 4 being the finishing point of the tier, as shown in Table 6.

TABLE 6

| Starting Point | Finishing Point |
|---|---|
| Node 0 | Node 1, Node 2, Node 6 |
| Node 1 | Node 3, Node 7 |
| Node 2 | Node 5 |
| Node 6 | Node 4 |

The corresponding clock routings are shown in FIG. 8A.

Figure 8C:
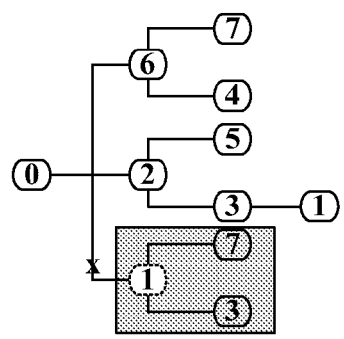
FIG. 8C is a view illustrating a substitute clock channel after abnormality of the clock channel between node 0 and node 1 in the computer system shown in FIG. 6.
Figure 8D:
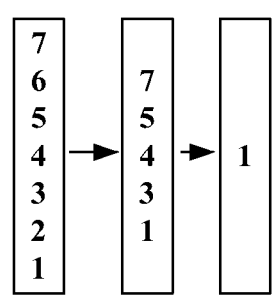
FIG. 8D is a view schematically illustrating the remaining nodes not configured in the forming process in FIG. 8C.

If the clock channel between the configured node 0 and node 1 becomes abnormal, nodes 1, 3 and 7 could not obtain clocks supplied by the clock source. In such case, it is possible to learn from the clock relation connection Table 1 that there is still backup connection channel between node 3 and node 2, and node 1 is directly connected to node 3, so that it is possible to initiate or select the connection channel from node 2 to node 3 as the clock channel between node 2 and node 3, close the connection channel from node 1 to node 3, and initiate the connection channel from node 3 to node 1 as the clock channel between node 3 and node 1, as shown in FIG. 8C, so that node 1 and node 3 can still obtain clocks supplied by the clock source. Remaining nodes not configured in the configuring process are as shown in FIG. 8D. Moreover, as can be further learnt from the clock connection Table 1, there is backup connection channel between node 7 and node 6, and the connection channel from node 6 to node 7 is initiated as the clock channel between node 6 and node 7, as shown in FIG. 8C, thus, node 7 can still obtain the clocks supplied by the clock source.

Figure 9:
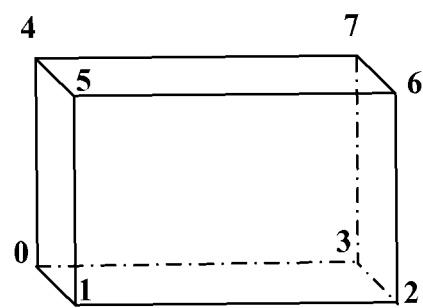
FIG. 9 is a view schematically illustrating another clock connection of the eight nodes in the computer system shown in FIG. 6.

FIG. 9 is a view schematically illustrating another clock connection of the eight nodes in the computer system shown in FIG. 6. It is also expressed as a cuboid, with up and down, front and back, and left to right sequential loops, while no crossing is present. The clock relation connection table thereof is shown in Table 7.

TABLE 7

| Starting Point | Finishing Point |
|---|---|
| 0 | 1, 3, 4 |
| 1 | 0, 2, 5 |
| 2 | 1, 3, 6 |
| 3 | 0, 2, 7 |
| 4 | 0, 5, 7 |
| 5 | 1, 4, 6 |
| 6 | 2, 5, 7 |
| 7 | 3, 4, 6 |

The aforementioned device and method embodiments guarantee clock synchronization of various nodes in a partition system through clock connection channels amongst nodes and the clock configuring method. Moreover, when some of the node clocks are abnormal, the system will not be affected—that is to say, when the system is still not boosted, if some of the node clocks are abnormal, it is still possible to construct a partition to normally run the system. When some of the node clock channels are abnormal, it is maximally guaranteed that the partition system is not affected. When some of the nodes are abnormal, it is maximally guaranteed that a partition system formed by the remaining nodes is not affected. When the number of abnormal nodes is too many to construct a partition, it is still possible to use the remaining nodes to construct several independent partition systems.

The clock connection modes among the nodes in the aforementioned device and method embodiments can also be applied to quick path interconnect (QPI) of partitions, and can be applied to similar connections among nodes in other systems.

It is apparent to those ordinarily skilled in the art that the entire or partial steps in the aforementioned method embodiments can be realized by a program that instructs relevant hardware, and the program can be stored in a computer-readable storage medium and, when executed, executes the steps of the aforementioned method embodiments; the storage medium may include such program-code-storing medium as a read-only memory (ROM), a random access memory (RAM), a magnetic disk or an optical disk.

Finally, it should be noted that the above embodiments are merely used to describe the technical solutions of the present invention, rather than to restrict the present invention. Although the present invention is described in detail with reference to the foregoing embodiments, it should be understood by those ordinarily skilled in the art that it is still possible to modify the technical solutions recorded in the various foregoing embodiments or to equivalently substitute partial technical features thereof. These modifications or substitutions will not make the essence of the corresponding technical solutions depart from the spirit and scope of the technical solutions of the various embodiments of the present invention.

What is claimed is:

1. A computer system, comprising:
at least two nodes, wherein each of the at least two nodes includes a selecting module and a processor, wherein inputs to the selecting module of any node comprise clock of the node and clock output from another node, and an output terminal of the selecting module is connected to the processor of the node and an input terminal of the selecting module of another node; and
a clock controlling module, wherein an output terminal of the clock controlling module is connected to a control terminal of the selecting module, for controlling the clocks of the at least two nodes to have the same clock,
wherein the clock controlling module is provided with a clock relation connection table in which clock channels from one of the at least two nodes to any of the rest of the at least two nodes are recorded, and
wherein the clock controlling module controls the selecting modules of the at least two nodes to select a clock of one of the at least two nodes as a common clock source for the at least two nodes, and in response to determining that the clock of the selected node becomes abnormal, the clock controlling module controls the selecting modules of the rest of the at least two nodes to select another available common clock source according to the clock channels recorded in the clock relation connection table such that the rest of the at least two nodes are provided with the same clock.

2. The computer system according to claim 1, wherein the computer system comprises four nodes connected to one another via selecting modules into a loop, wherein inputs to the selecting module of each node comprise the clock of the node and outputs from the selecting modules of two nodes connected to the node.

3. The computer system according to claim 1, wherein the computer system comprises eight nodes respectively located at each vertex of a cuboid, wherein four nodes within various surfaces of the cuboid are cross connected to one another via selecting modules or every two adjacent nodes are connected to one another via selecting modules, each node is connected to three nodes via selecting modules, and inputs to the selecting module of each node comprise the clock of the node and outputs from the selecting modules of the three nodes connected to the node.

4. The computer system according to claim 1, wherein the computer system comprises n×8 nodes, wherein every eight nodes are respectively located at each vertex of a cuboid, four nodes within various surfaces of the cuboid are cross connected to one another via selecting modules or sequentially connected one after the other via selecting modules, each node is connected to 3+n nodes via selecting modules, nodes at the same positions on each cuboid are connected via selecting modules, and inputs to the selecting module of each node comprise the clock of the node and outputs from the selecting modules of the 3+n nodes connected to the node, wherein n is a natural number that is greater than 0.

5. The computer system according to claim 1, wherein nodes belonging to an identical partition system in the computer system are directly or indirectly connected to one another, and intermediate nodes being indirectly connected and nodes at both ends being indirectly connected are located in the identical partition system.

6. The computer system according to claim 1, wherein connection between the output terminal of the selecting module and the input terminal of the selecting module of another node is achieved via a processor interconnection cable.

* * * * *